April 21, 1931. W. W. BULIFANT 1,801,719
SUPPORTING ATTACHMENT FOR LATHES
Filed Dec. 10, 1929
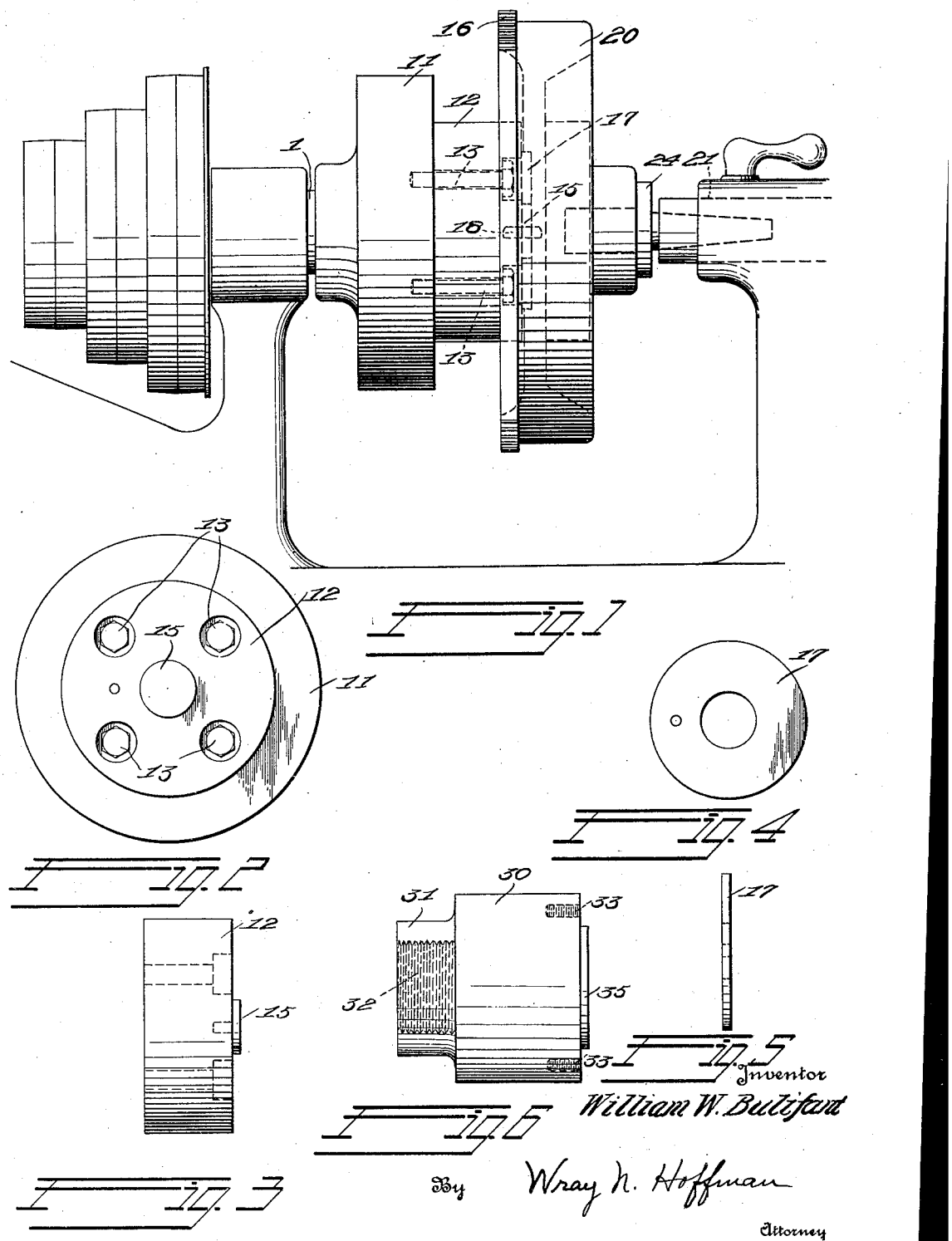

Patented Apr. 21, 1931

1,801,719

UNITED STATES PATENT OFFICE

WILLIAM W. BULIFANT, OF MIAMI, FLORIDA

SUPPORTING ATTACHMENT FOR LATHES

Application filed December 10, 1929. Serial No. 412,994.

This invention relates to fixtures or attachments for lathes or turning machines. More particularly, it has to do with attachments for supporting a work piece having a counter-sunk portion such as a fly-wheel in properly aligned position upon the driving head of a lathe or turning machine.

An object of the invention is to provide a supporting fixture or attachment which includes means for centering or positioning the work piece in proper alignment upon said fixture or attachment.

Another object of the invention is to provide a fixture or attachment for supporting a work piece having a central countersunk portion which includes a centering or aligning means of such construction as to snugly interfit the countersunk portion.

A further object of the invention is to provide a fixture or attachment for supporting a work piece having a central countersunk portion in which the centering or aligning means may be varied so as to accommodate countersunk portions of workpieces of different sizes.

Other important objects of the invention will be explained in the following detailed description and all features are illustrated in the accompanying drawings wherein similar reference numerals designate corresponding parts in the several figures and wherein:

Figure 1 is a side elevation of a lathe showing the attachment of this invention used in connection therewith.

Figure 2 is a face view of the head or face plate which is adapted to be secured to the driving head of the lathe.

Figure 3 is a side view of the head or face plate shown in Figure 2.

Figure 4 is a face view of the centering washer.

Figure 5 is a side view of the centering washer shown in Figure 4.

Figure 6 is a side view showing a modification of the fixture or attachment of this invention.

Referring to the drawings 1 designates the driving member or spindle of a lathe which carries a driving head 11 to the face of which is secured the fixture or attachment of this invention. According to Figures 1, 2, 3, 4 and 5, the attachment comprises a head or face plate 12 and a centering member or washer 17.

The head or face plate 12 in the form shown, is cylindrical in shape, and is provided with a plurality of large holes extending therethrough and suitably spaced from each other. The holes adjacent the exterior face of the plate are cut away so as to form grooves. Mounted substantially centrally of the exterior face of the plate is a ring 15 which projects beyond said face. The exterior face of the plate 12 is also provided with a small hole for the purpose hereinafter described. The head or plate 12 is secured to the driving head 11 by means of the headed bolts 13, the bolts passing through the large holes in the head or plate 12.

The work piece 16 in the construction shown, is a fly-wheel having a central countersunk portion. Mounted within the countersunk portion is a centering member or washer 17 which is of such width and diameter as to snugly interfit said countersunk portion. The size of the centering member or washer 17 may be varied depending upon the size of the countersunk portion of the work piece 16. The centering member 17 is provided with a central opening. Both the fly-wheel and the centering member or washer 17 are provided with a small hole for the purpose hereinafter described.

In assembling the work piece 16 upon the fixture or attachment a centering member or washer 17 of such width and diameter as to snugly interfit the countersunk portion of the work piece is inserted within said countersunk portion. The centering member or washer 17 is so arranged within the countersunk portion of the work piece 16 that the small holes in the work piece and centering member are in direct alignment. A dowel pin 18 is then inserted in the small hole of the centering member 17. The work piece 16 is then placed in contact with the head 12 in such manner that the central opening of the centering member 17 surrounds the ring 15 of the head 12, and that the dowel pin 18 will engage with the small hole in the exterior face of the head 12. As soon as the work piece 16 is mounted upon the head 12, the lock plate 20 of the tail stock 21 which is in retracted position is advanced by the usual means so as to cause it to engage the face of the work piece 16 and hold it securely upon the head 12 of the driving member 11.

The tail stock 21 comprises a lock plate 20 and a tail stock center 24. The movement of the tail stock center relative to the lock plate 20 causes the lock plate to be moved into engagement with the work piece 16. As the tail stock 21 is of the usual construction no detailed description appears to be necessary.

In the form shown in Figure 6 the fixture or attachment of this invention comprises a head cylindrical in shape 30 which is adapted to be mounted upon the driving member 1 of a lathe. The cylindrical head 30 has a reduced portion 31 provided with a centrally threaded opening 32. The face opposite the reduced portion 31 of the head 30 is provided with a plurality of threaded holes 33. Projecting centrally from the face of the cylindrical member 30 is a centering member or washer 35. This centering member or washer 35 is of such width and diameter as to snugly interfit the countersunk portion of the work piece which is to be mounted thereon.

The work piece 16 in the form of a fly-wheel having a centrally countersunk portion is mounted upon the cylindrical head 30 in such manner that the centering member 35 snugly interfits the countersunk portion of the fly-wheel. The work piece 16 is secured to the cylindrical head 30 by means of suitable threaded bolts. Due to the fact that the bolt holes are threaded the work piece 16 is rigidly secured to the cylindrical member and is driven thereby. In this form, the tail stock for holding the work piece 16 on the attachment may be dispensed with. It is to be noted that the attachment or fixture may be employed for a work piece having a central countersunk portion of a diameter corresponding to the centering member of the attachment. For each change in the diameter of the countersunk portion of the work piece, an attachment having a centering member corresponding thereto must be employed.

With the attachments or fixtures of this invention, work pieces of the type aforementioned may be machined or otherwise fashioned in a simple, effective, and accurate manner, and in a very short period of time.

Having fully described the invention, what I claim as new and desire to secure by Letters Patent is:

1. An attachment for a lathe comprising a head having a projection extending from a face thereof adapted to be secured to the driving member of a lathe, and a rigid non-expansible centering member of such size as to interfit the counter-sunk portion of a work piece mounted upon said projection and supported thereby.

2. An attachment for a lathe comprising a head having a projection extending from a face thereof adapted to be secured to the driving member of a lathe, a rigid non-expansible centering member of such size as to interfit the counter-sunk portion of a work piece mounted upon said projection and supported thereby, and means for holding said centering member in fixed aligned position on said projection.

3. An attachment for a lathe comprising a head having a projection extending from a face thereof adapted to be secured to the driving member of a lathe, a rigid non-expansible centering member of such size as to interfit the counter-sunk portion of a work piece mounted on said projection and supported thereby, means for holding said centering member in fixed aligned position on said projection, and means for securing the work piece in assembled relation upon said head.

WILLIAM W. BULIFANT.